3,115,528
PURIFICATION OF METHYL CHLOROFORM
Floyd E. Benner, Jr., and Russell R. May, Jr., Wadsworth, and Donald A. Reich, Barberton, Ohio, assignors, by mesne assignments, to Pittsburgh Plate Glass Company
Filed Dec. 8, 1960, Ser. No. 74,556
9 Claims. (Cl. 260—652)

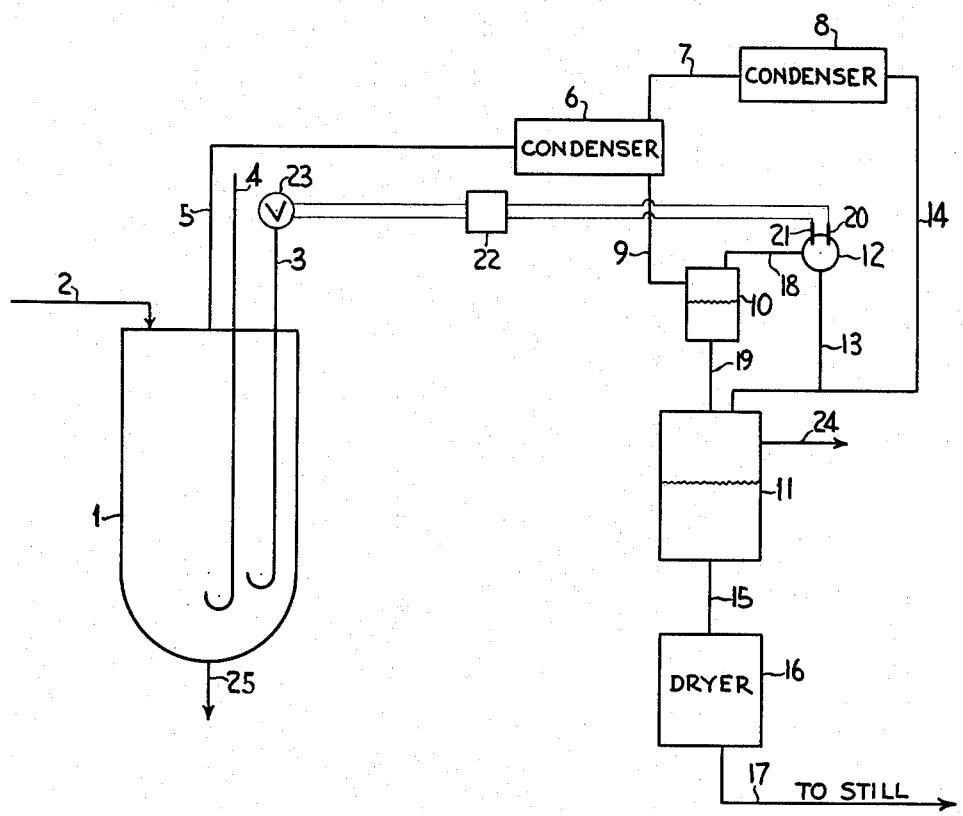

The present invention relates to the manufacture of methyl chloroform. More particularly, the present invention relates to the recovery of methyl chloroform from liquid mixtures of methyl chloroform having a Friedel-Crafts catalyst present therein.

In the preparation of methyl chloroform especially by techniques involving catalytic hydrochlorination, methyl chloroform liquid product is produced which contains as a consequence of the process involved quantities of Friedel-Crafts catalyst therein, usually a metal halide such as anhydrous ferric chloride. In attempting to recover methyl chloroform from liquid bodies containing contaminating quantities of Friedel-Crafts or metal halide catalyst, serious difficulties are encountered due to the presence of these catalysts. Thus, for example, in applications wherein methyl chloroform liquid bodies containing anhydrous ferric chloride catalyst are formed, serious decomposition of the methyl chloroform product often accompanies any attempts to recover the product from the catalyst containing liquid bodies by standard distillation techniques. This phenomenon occurs primarily for the reason that anhydrous ferric chloride catalyzes the decomposition of methyl chloroform at elevated temperatures to produce vinylidene chloride. In fact, one of the prior art methods of manufacturing vinylidene chloride involves the thermal decomposition of methyl chloroform in the presence of a ferric chloride catalyst and is described in U.S. Patent 2,676,997, granted April 27, 1954. Thus, in any process involving the preparation of methyl chloroform where liquid bodies of methyl chloroform containing Friedel-Crafts catalyst are produced and the methyl chloroform product is to be obtained therefrom, in pure form, that is, free of catalyst, serious reductions in the overall efficiency of the process are encountered due to the thermal decomposition of methyl chloroform upon distillation.

According to the present invention, a method is provided for recovering methyl chloroform from methyl chloroform containing Friedel-Crafts metal halide catalysts and from mixtures of methyl chloroform and hydrocarbon chlorides which contain Friedel-Crafts metal halide catalysts therein. Typical of the metal halides normally found as catalyst is anhydrous ferric chloride. In accordance with the teachings of this invention, methyl chloroform or mixtures of methyl chloroform and hydrocarbon chlorides which contain a metal halide such as anhydrous ferric chloride therein are simultaneously ammoniated and steam distilled to provide an overhead of methyl chloroform and/or methyl chloroform and hydrocarbon chlorides free of metal halide while the metal halide is left behind as bottoms in the distillation zone. Thus, by the instant process a methyl chloroform overhead is provided which contains substantially no ferric chloride where anhydrous ferric chloride is the catalyst material contaminating the methyl chloroform. The ferric chloride in such an instance is converted to ferric hydroxide which is left behind as bottoms in the vaporization zone. If other metal halide catalysts are employed in lieu of ferric chloride, they are similarly left behind in the vaporization zone as their corresponding hydroxide while the methyl chloroform is recovered as overhead substantially free of metal halide. Removal of hydroxides accumulating in the distillation zone may be accomplished by periodic or continuous draining of bottoms from this zone.

For a more complete understanding of the instant invention, reference is made to the accompanying drawing which is a diagrammatical illustration of a methyl chloroform recovery unit for recovering methyl chloroform from a methyl chloroform liquid body having a Friedel-Crafts catalyst present therein.

As seen in the drawing, a pot 1 is provided having a suitable inlet 2 through which the methyl chloroform containing liquid body treated may be introduced. The pot 1 is provided with two additional inlet pipes 3 and 4 which traverse substantially the longitudinal axis of the pot 1 and terminate in U-shaped dip legs at a point slightly above the bottom thereof. Inlet pipe 3 is utilized for the introduction of gaseous ammonia to the pot while inlet pipe 4 is utilized for the admission of steam to the pot. In the uppermost portion of the pot, there is provided a vapor outlet 5 which communicates with a condenser 6. Vapors not completely condensed in unit 6 are removed through a vapor outlet 7 and further cooled to effect complete condensation in condenser 8. Liquid products condensed in unit 6 are passed to a small phase separator 10 which by gravity separates the aqueous liquids from the organic liquids. The aqueous liquids are removed from this small phase separator and passed through lines 18 and 13 to a large phase separator 11. Located at the jointure of lines 13 and 18 is an expanded bulb 12 in which are located two electrodes 20 and 21. These electrodes are connected to a pH recorder-controller 22 which, in turn, is connected to valve 23 located on line 3. The pH recorder-controller is responsive to the pH of the aqueous solutions passing through the bulb 12 and automatically adjusts the admission of ammonia to the pot 1 in response to the pH by mechanical regulation of the valve 23.

Organics separated in the unit 10 are passed into the large phase separator 11 through line 19 and all material condensed in the total condenser 8 are admitted to the large phase separator 11 through line 4. The organics separated in unit 11 are passed through line 15 to a dryer 16 and after drying are admitted to the distillation system through line 17. Aqueous material is removed from the large phase separator 11 through a line 24 and may be discharged as waste material.

In operating the system as shown in the diagrammatical illustration, the methyl chloroform catalyst-containing liquid medium is admitted to the pot 1 through line 2. To the pot 1 simultaneously with the admission of the liquid methyl chloroform is admitted live steam through line 4 and gaseous ammonia through line 3. The vapor overhead discharged from the pot through line 5 is condensed in the condenser 6 and the liquid condensate is passed through line 9 to the small phase separator 10. Uncondensed vapors emerging from condenser 6 are passed via line 7 to condenser 8 where they are totally condensed and sent to phase separator 11 through line 14. Under atmospheric conditions of pressure, the temperatures of the vaporization zone or pot 1 is maintained at between 150° F. to 215° F. Should pressure operation or operation under vacuum be desired corresponding changes in temperature would of course be utilized.

Organic condensate collected in the small phase separator 10 is passed through line 19 to the large phase separator 11. The aqueous portion of the condensate collected in the small phase separator 10 is passed through line 18 to an enlarged section or bulb 12 in this line and contacted therein with electrodes 20 and 21 of the pH recorder-controller 22. The liquid after contact with the electrodes is passed through line 13 to the large phase separator 11. The aqueous phase of the phase separator 11 is discarded through line 24 while the organic phase is passed through line 15 to a dryer 16 which removes any water entrained in the organic stream. After passing through the dryer 16, the dried organic methyl chloroform product stream is introduced through line 17 to the distillation system for recovery of purified methyl chloroform.

During the passage of aqueous material through the bulb 12 and its contact with the electrodes 20 and 21 therein, the pH of the aqueous material is constantly being recorded by the pH controller-recorder 22. The controller-recorder is normally set to maintain the pH of the aqueous solution in the bulb 12 between 6 and 11 and preferably between 7.5 and 8.5. Values of pH which exceed or fall below the prescribed limits set by the recorder-controller cause the controller to actuate the ammonia valve 23 in line 3 to increase or decrease the admission of ammonia to the pot 1 to thereby bring the aqueous solution back to the prescribed limit set on the instrument. Any "gunk" or waste material formed in the bottom of pot 1 by the precipitation of metal hydroxides such as ferric hydroxide is removed from the bottom thereof where phase separation of the organic and aqueous phases was conducted.

Utilizing this equipment, 100 cc. of water were added to the glass flask and steam was admitted to heat up the system. Organic feed material and ammonia were introduced to the flask as soon as the overhead temperature of the glass flask reached 158° F. to 176° F. The flask was operated with an overhead temperature of 185° F. and ammonia was consumed on the order of .004 to .006 pound of ammonia per pound of organic feed. The overhead temperature of the flask was easily maintained at the desired 185° F. temperature by increasing or decreasing the change in the steam rate with any change in temperature up or down. Utilizing this equipment in this manner, several runs were made in which methyl chloroform containing anhydrous ferric chloride as a catalyst therein was admitted to the flask with the simultaneous ammoniation and distillation under steam of the product. The results of these runs are set forth below in Table I.

*Table I*

| Run No. | Feed | | NH₃ | | Residue | | | Aqueous Overhead | | | Total gm. | Organic Overhead pH [1] | | Loss Percent of Feed |
|---|---|---|---|---|---|---|---|---|---|---|---|---|---|---|
| | Avg. gm./hr. | Total gm. | Total gm. | gm./gm. Org. | Total gm. | gm./gm. Org. | pH | Total gm. | gm./gm. Org. | pH | | Before Drying | After Drying | |
| 1 | 925.0 | 925.0 | 6.0 | 0.0065 | 266.0 | 0.288 | 8.0 | 26.1 | 0.282 | 12.0 | 896 | 9.0 | 7 to 8 | 3.2 |
| 2 | 515.0 | 2,180.6 | 32.2 | 0.015 | 893.5 | 0.410 | 11.0 | 446.0 | 0.205 | 12.0 | 2,174.0 | 10 | 12 | 0.3 |

[1] pH measured with pH paper.

pot by periodically bleeding off bottoms from the pot 1 through line 25.

The separation of methyl chloroform from other organic chlorides contained in the methyl chloroform stream free of catalyst which is removed from dryer 16 through line 17 is accomplished readily by recourse to conventional distillation procedures. Thus, a first still may be provided and operated under such conditions of temperature and pressure that all materials boiling at temperatures below that of methyl chloroform are removed as overhead leaving behind the methyl chloroform as bottoms. The methyl chloroform bottoms may then be conveniently subjected to further distillation to provide a methyl chloroform overhead while the materials boiling at temperatures above methyl chloroform are left behind as bottoms.

In operating the process in this manner, no problems are encountered with the ferric hydroxide precipitate formed by the simultaneous ammoniation and the steam distillation of the methyl chloroform liquid bodies entering the pot 1. In addition no serious corrosion problems are encountered when the present system is employed. This corrosion represents a serious problem where methyl chloroform crudes are water washed and steam distilled.

For a more complete understanding of the present invention, reference is made to the following example which is illustrative of one of the modes of operating process of the present invention:

EXAMPLE

A one liter resin flask was equipped with two glass inlet pipes having dip legs therein, one for admission of ammonia to the interior of the flask and the other for the admission of steam. The steam was introduced at a temperature of 212° F., the temperature being maintained by encasing the glass tube on the outside of the flask being admitted thereto with an electrical heating tape. The gaseous ammonia was admitted to the flask at ambient temperature (70° F.). An inlet line enclosed in the glass tubing and situated at the top of the flask in the cover thereof was utilized to feed the methyl chloroform catalyst containing mixture. Material removed from the flask was removed from an overhead line and introduced through a glass condenser to a reservoir located at the As can be readily seen from Table I, good recovery of the feed was obtained during the operation and no problems were encountered whatsoever in the operation of the system. While the invention has been described with reference to certain illustrative embodiments, it is not intended to be so limited except insofar as appears in the accompanying claims.

We claim:

1. A method of recovering methyl chloroform from liquid methyl chloroform having ferric chloride present therein comprising, introducing said liquid into a vaporization zone operating at a temperature sufficient to vaporize said methyl chloroform while continuously introducing into said zone with said liquid gaseous ammonia and steam in quantities sufficient to provide an overhead of methyl chloroform, and water vapor, condensing said overhead and maintaining the water phase of the condensate at a pH between 7.5 and 11.

2. A method of recovering methyl chloroform from a liquid mixture of methyl chloroform and organic hydrocarbon chlorides having a Friedel-Crafts metal halide catalyst present therein comprising, introducing said liquid into a vaporization zone operating at a temperature sufficient to provide for the vaporization of methyl chloroform while continuously introducing gaseous ammonia and steam into said zone to thereby provide an overhead of methyl chloroform and water vapor, condensing, said overhead and maintaining the water phase of the condensed overhead at a pH in the range of between 7.5 and 11.

3. A method of recovering methyl chloroform from a liquid mixture of methyl chloroform and hydrocarbon halides having present therein ferric chloride catalyst comprising, introducing said liquid into a vaporization zone operating at a temperature sufficient to provide a methyl chloroform overhead while continuously introducing into said vaporization zone with said liquid gaseous ammonia and steam in quantities sufficient to provide a methyl chloroform containing overhead having a pH within the range of 7.5 and 11.

4. A method of recovering methyl chloroform from liquid methyl chloroform having ferric chloride catalyst present therein comprising, introducing said liquid into a vaporization zone operating at a temperature sufficient to provide a methyl chloroform overhead, continuously feeding into said vaporization zone with said liquid gaseous ammonia and steam in quantities sufficient to provide water and methyl chloroform overhead having a pH in the range of between 7.5 and 11, continuously measuring said pH and automatically regulating the quantity of ammonia fed to said vaporization zone as the pH of the overhead falls outside of the desired range.

5. The method of claim 2 wherein the temperature of the vaporization zone is maintained between 150° F. and 215° F.

6. The method of claim 3 wherein the temperature of the vaporization zone is maintained between 150° F. and 215° F.

7. The method of claim 4 wherein the temperature of the vaporization zone is maintained between 150° F. and 215° F.

8. The method of recovering methyl chloroform from liquid methyl chloroform having a Friedel-Crafts catalyst present therein comprising, introducing said liquid into a vaporization zone maintained at a temperature between 150° F. and 215° F., introducing gaseous ammonia and steam to said zone to provide an overhead of methyl chloroform and water vapors, condensing said methyl chloroform and water vapors, phase separating the condensed liquid to provide an organic methyl chloroform containing phase and an aqueous phase, and maintaining the aqueous phase at a pH of between 7.5 and 11.

9. The method of claim 8 wherein the pH is maintained between 7.5 and 8.5.

References Cited in the file of this patent

UNITED STATES PATENTS

| | | |
|---|---|---|
| 2,209,000 | Nutting | July 23, 1940 |
| 2,356,785 | Hammond | Aug. 29, 1944 |
| 2,593,451 | Hill et al. | Apr. 22, 1952 |

OTHER REFERENCES

Mellor: Modern Inorganic Chemistry, Longmans, Green and Co., New York (1925), p. 652.